(12) United States Patent
Eriksen et al.

(10) Patent No.: US 9,276,488 B2
(45) Date of Patent: Mar. 1, 2016

(54) CONTROL SYSTEM FOR POWER STACKS IN A POWER CONVERTER, POWER CONVERTER WITH SUCH CONTROL SYSTEM AND WIND TURBINE WITH SUCH POWER CONVERTER

(71) Applicant: KK WIND SOLUTIONS A/S, Ikast (DK)

(72) Inventors: Anders Eriksen, Herning (DK); Rasmus Nielsen, Brande (DK)

(73) Assignee: KK WIND SOLUTIONS A/S, Ikast (DK)

( * ) Notice: Subject to any disclaimer, the term of this patent is extended or adjusted under 35 U.S.C. 154(b) by 0 days.

(21) Appl. No.: 14/373,180

(22) PCT Filed: Jan. 28, 2013

(86) PCT No.: PCT/DK2013/050027
§ 371 (c)(1),
(2) Date: Jul. 18, 2014

(87) PCT Pub. No.: WO2013/110282
PCT Pub. Date: Aug. 1, 2013

(65) Prior Publication Data
US 2015/0249401 A1 Sep. 3, 2015

(30) Foreign Application Priority Data
Jan. 27, 2012 (WO) ............... PCT/DK2012/050035

(51) Int. Cl.
*F03D 9/00* (2006.01)
*H02P 9/04* (2006.01)
(Continued)

(52) U.S. Cl.
CPC .............. *H02M 5/458* (2013.01); *F03D 9/005* (2013.01); *H02J 3/46* (2013.01); *H02M 5/4585* (2013.01);
(Continued)

(58) Field of Classification Search
USPC .......................... 290/44, 55; 363/17
See application file for complete search history.

(56) References Cited

U.S. PATENT DOCUMENTS 7,372,709 B2 * 5/2008 Mazumder .............. H02J 3/387
363/132
7,394,166 B2 * 7/2008 Teichmann ............... H02J 3/38
290/44

(Continued)

FOREIGN PATENT DOCUMENTS

WO WO2008128544 A1 10/2008
WO WO2011044933 A1 4/2011

OTHER PUBLICATIONS

PCT International Search Report; International Application No. PCT/DK2013/050027; Date of Actual Completion of International Search: Nov. 25, 2013; Date of Mailing of International Search Report: Sep. 12, 2013.

(Continued)

*Primary Examiner* — Pedro J Cuevas
(74) *Attorney, Agent, or Firm* — Pearne & Gordon LLP (57) ABSTRACT

A control system for one or more power stacks in a power converter is disclosed, each power stack comprising a plurality of electronic switches, said control system comprising one or more controllers, wherein a distributed clock signal from a real-time communication system is used as synchronization means for the switches in the power stacks. One or more controllers controlling the switching times of the switches in one or more power stacks may be connected directly to one or more real-time communication buses of the real-time communication system, using the distributed clock signal for synchronization of pulses when using the one or more power stacks for pulse-width modulation of a desired AC output voltage. Furthermore, a power converter comprising such a control system and a wind turbine comprising such a power converter are disclosed.

18 Claims, 4 Drawing Sheets

(51) Int. Cl.
  *H02M 5/458* (2006.01)
  *H02J 3/46* (2006.01)
  *H02M 3/335* (2006.01)
  *H02M 1/00* (2007.01)
  *H04J 3/06* (2006.01)

(52) U.S. Cl.
  CPC ...... *H02M 2001/0067* (2013.01); *H04J 3/0658* (2013.01); *Y02E 10/76* (2013.01); *Y10T 307/707* (2015.04)

(56) References Cited

U.S. PATENT DOCUMENTS

| | | | | |
|---|---|---|---|---|
| 7,518,886 B1* | 4/2009 | Lai | ............ | H02P 8/12 363/17 |
| 7,787,270 B2* | 8/2010 | NadimpalliRaju | ....... | H02J 4/00 363/37 |
| 7,986,535 B2* | 7/2011 | Jacobson | ............ | H02M 1/34 363/17 |
| 8,381,658 B1* | 2/2013 | Miller | ............ | B61C 7/04 105/26.05 |
| 2004/0037092 A1* | 2/2004 | Kurio | ............ | H02M 3/3376 363/17 |
| 2008/0084070 A1* | 4/2008 | Teichmann | ............ | H02J 3/38 290/55 |
| 2009/0021966 A1* | 1/2009 | Jacobson | ............ | H02M 1/34 363/52 |
| 2009/0067200 A1* | 3/2009 | Bolz | ............ | H02J 7/0014 363/17 |
| 2009/0123786 A1* | 5/2009 | Brown | ............ | H01M 8/0488 429/411 |
| 2009/0190375 A1* | 7/2009 | Manabe | ............ | H02M 3/1584 363/17 |
| 2009/0225569 A1* | 9/2009 | Begalke | ............ | H02M 3/3378 363/17 |
| 2011/0199792 A1* | 8/2011 | Friebe | ............ | H02M 1/36 363/17 |
| 2013/0083563 A1* | 4/2013 | Wang | ............ | H02M 3/33507 363/17 |
| 2014/0072887 A1* | 3/2014 | O'Leary | ............ | H01M 8/0488 429/410 |
| 2014/0255810 A1* | 9/2014 | Lenz | ............ | H01M 8/04619 429/430 |
| 2014/0307481 A1* | 10/2014 | Wang | ............ | H02M 3/285 363/17 |
| 2014/0346962 A1* | 11/2014 | Sanders | ............ | H05B 33/0815 315/193 |
| 2015/0006986 A1* | 1/2015 | Buyuktosunoglu | .... | G11C 29/32 714/727 |
| 2015/0032962 A1* | 1/2015 | Buyuktosunoglu | . | G06F 12/0811 711/122 |
| 2015/0121052 A1* | 4/2015 | Emma | ............ | G06F 9/4403 713/1 |

OTHER PUBLICATIONS

"Real-Time Ethernet—Industry Prospective"; Max Felser, Member, IEEE; Invited Paper; Proceedings of teh IEEE, vol. 93, No. 6, Jun. 1, 2005; pp. 1118-1129.

* cited by examiner

CONTROL SYSTEM FOR POWER STACKS IN A POWER CONVERTER, POWER CONVERTER WITH SUCH CONTROL SYSTEM AND WIND TURBINE WITH SUCH POWER CONVERTER

CROSS-REFERENCES TO RELATED APPLICATIONS

This application is the national phase of International Application No. PCT/DK2013/050027 filed on Jan. 28, 2013, which claims the benefit of priority to International Application No. PCT/DK2012/050035 filed on Jan. 27, 2012. The entire disclosures thereof are incorporated herein by reference.

FIELD OF THE INVENTION

The present invention relates to a control system for power stacks in a power converter, such as for instance a power converter in a wind turbine, to a power converter comprising such a control system and to a wind turbine comprising such a power converter.

BACKGROUND OF THE INVENTION

When using power converters with a plurality of power stacks, for instance for pulse-width modulation of a desired AC output signal, it is crucial that the switching times of the electronic switches in the power stacks are well synchronized in order to achieve a proper current sharing between the paralleled power stacks.

Power converters known in the art are forced to derate the power output due to reduced control of current sharing.

BRIEF DESCRIPTION OF THE INVENTION

It is an object of the present invention to provide a control system that increases the accuracy of the synchronization of power switches in different power stacks in a power converter so that the above-mentioned disadvantages of the power converters known in the art may be eliminated or at least significantly reduced.

The present invention relates to a control system for one or more power stacks in a power converter, each power stack comprising a plurality of electronic switches, said control system comprising one or more controllers, wherein a distributed clock signal from a real-time communication system is used as synchronization means for the switches in the power stacks.

It should be noted that by the expression "electronic switch" is meant any kind of electronic or electromechanical switch, which may be used in a power stack of a power converter.

It is very advantageous to be able to control the switching times of the individual switches in relation to a common synchronization signal, because it allows for a more precise control of the individual switching times, which in turn increases the possibilities of controlling the power stacks and of current sharing between paralleled power stacks.

Modern real-time communication systems are very fast and the clock signals of such systems are very accurate with a very small variation in the duration of the individual clock periods.

A real-time communication system is to be understood as a deterministic system, in which it is possible to predict the time of the arrival of data packets at a given destination. For instance, this means that if, for some reason, a data packet does not arrive at its destination as expected, the time of arrival of the next data packet at that destination is already known.

Hence by using a real-time communication system, arrival times or delays in the communication system are known, which is important in controlling a power converter. In some cases, a real time communication system is also referred to as an industrial Ethernet. More information may be found in the IEC 61158 fieldbus standard.

In an embodiment of the invention, one or more controllers controlling the switching times of the switches in one or more power stacks are connected directly to one or more real-time communication buses of the real-time communication system, using the distributed clock signal for synchronization of pulses when using the one or more power stacks for pulse-width modulation of a desired AC output voltage.

Connecting the controllers directly to the real-time communication bus(es) ensures that the distributed clock signal will reach each of the controllers simultaneously, and the synchronization across controllers (and, thereby, across different power stacks) is optimized.

Also, it is advantageous to connect the power stack controllers directly to the communication bus(es) because this configuration may eliminate the need of some nodes or wires in the communication system, which nodes or wires might otherwise add jitter or unpredictable delays to the communication.

Preferably, the communication bus(es) comprise(s) optic fibers having the advantage that hereby is provided fast and reliable data communication. Because of the very fast switching times in the power converter, reliability and speed of data communication in the communication system is very important.

Furthermore it is very advantageous to be able to use real-time communication bus because such a use decreases the need of wired connections. Instead of having a number of individual connections from a controller to each of the individual switches in each power stack, control data is communicated via the real-time communication bus. Having distributed power stack controllers for each power stack enables coordinated control of the power stacks instead of requiring a central controller which turns on/off all switches in the system.

Furthermore it is advantageous to minimize the number of wired connections because every communication path introduces sources of faults, is time consuming to install and may require subsequent maintenance.

In an embodiment of the invention, the power converter is a part of a power generation system, such as a wind turbine, a wind power plant or a solar power plant.

The power converters used in most modern wind turbines are of types that can benefit from the control system of the present invention. In most cases, however, a dedicated interface between the control system and the power converters will be needed. Such a dedicated interface preferably comprises one or more controllers handling the receiving and sending of data between the control system, the controller of the power converter and the controller of the power stack controllers.

It should be mentioned that similar dedicated interfaces may be used between the control system and other controllers of the wind turbine.

In an embodiment of the invention, the one or more controllers form part of a larger control system for a wind turbine or a wind power park, the larger control system being arranged in a hierarchical master/slave configuration using the real-time communication system comprising one or more real-time communication buses.

Such a system configuration is advantageous in that it is infinitely scalable because, apart from adding more controllers to a given hierarchical level, it is always possible to add new levels to the controller hierarchy, either at the bottom level or at the top of the hierarchy.

Addition or removal of controllers, especially stack controllers, in relation to the present invention may be relevant in case of power converter faults, maintenance, replacement of entire power stacks, extension of the capacity of the power converter, etc.

Furthermore, due to the system configuration and the fact that the communication in the control system is real-time communication where one or more controllers, e.g., power stacks controllers, are connected directly to one or more real-time communication buses, the converter design is not limited, e.g., by the number of connection pins or ports on the power converter controller. Therefore, it is possible to add a plurality of power stacks (for instance in a parallel configuration) to the power converter.

This may be relevant in situations where the performance and/or capacity of the power converter is increased by paralleling or stacking (such as multi-level) power stacks. Individual control of each power stack enables using new control and derating strategies compared to what is known in the art.

In an embodiment of the invention, the real-time communication system is a real-time Ethernet system and the distributed clock signal is a clock signal distributed by the real-time communication buses of this system.

Ethernet systems possess a number of technical characteristics, which make them very useful in systems like the present invention. Furthermore, Ethernet uses a thoroughly tested technology, is easy accessible and low in price and, finally, it is usable even in noisy environments and over large distances.

In order to maintain speed and reliability in a large communication system covering an entire wind power park, hard wired communication lines are preferred. Wired communication lines of the control system are preferred over wireless communication, even though a wireless communication system may be easier and sometimes cheaper to install. This is because wireless communication systems suffer from the drawbacks of problems with reliability of data packets reaching their destination, introduction of noise, etc. Advantages of the wired communication lines, e.g. comprising optic fibers, are among others better bandwidth and a faster and more stable communication than with a wireless system.

In an embodiment of the invention, the distributed clock signal is used to synchronize the switching of the electronic switches in the power stacks so that simultaneous switching of the electronic switches is obtained.

A more simultaneous switching of the electronic switches reduces the short-circuit currents and/or enables current sharing control in the power converter. By using a control system according to the present invention, it has proven to be possible to synchronize the switching times of the electronic switches of an entire power converter to fall within a time period of significantly less than 10 microseconds.

In an embodiment of the invention, the distributed clock signal is used to synchronize the switching of the electronic switches in the power stacks so that the switching times of the different electronic switches are distributed throughout the switching period.

In an embodiment of the invention, the distributed clock signal is used to synchronize the switching of the electronic switches in the power stacks of the power converters of two or more wind turbines in a wind power park, preferably all the wind turbines in the wind power park.

Distributing the switching times of the different electronic switches throughout the switching period makes it possible to control the electronic noise from the switches, for instance by removing frequency peaks from the noise spectrum and using the noise from one converter to balance out the noise from other converters, so that the overall noise level in the output from the wind turbine or the wind power park is reduced.

In an embodiment of the invention, one or more of the one or more controllers of the control system comprises at least two data processors, and the at least two data processors are dedicated to handle communication to and from the controller in which they are located.

By the term "dedicated to handle communication" should be understood that even though a data processor is dedicated to handle communication to and/or from the controller in which it is located, the data processor may perform other tasks as long as it can take care of its main purpose, namely handling communication.

In an embodiment of the invention, one of the at least two data processors is dedicated to handle data sent to the controller, and another of the at least two data processors is dedicated to handle data sent from the controller in which they are located.

By assigning one data processor to receive data and another to send data, the communication speed is increased because it becomes possible to both write or send data, e.g. to a main controller, in the same communication frame as data is received, e.g. from the main controller.

In this way the data communication interface of a controller does not become a bottleneck limiting the performance of the controller because data processors of the controller do not very often need to wait for receiving data and, similarly, the results of processing data can be send to the receiver of the processed data faster.

In an embodiment of the invention, the controller comprising the at least two additional data processors is able to send and receive data within the same communication frame.

By communication frame should be understood a data exchange between controllers in data communication network. A communication frame comprises data to be exchanged between two or more controllers of the communication network. The contents and lengths of the communication frames and the intervals between sending/receiving them are defined by the software of one or more controllers.

Hence, the communication frames are flexible in the sense that contents, frequency, etc. may be changed if necessary.

It is very advantageous to be able to send and receive data in the same communication frame in that it halves the time used to communicate between two controllers compared to state of the art communication systems. In known communication systems, a controller typically needs one period (or frame) to receive data and another period (or frame) to send data.

In an aspect of the invention, it relates to a power converter comprising a control system as described above.

In an aspect of the invention, it relates to a wind turbine comprising one or more power converters as described above.

In an aspect of the invention, it relates to a method of synchronizing switches in one or more power stacks of a power converter, the method comprising the steps of:
  establishing a control system comprising at least a converter control station and a plurality of power stack controllers, establishing a real-time communication system through which the converter control station and the plurality of power stack controllers can communicate, and distributing a clock signal via said real-time communication system from said converter control station to the plurality of power stack controllers.

In an embodiment of the invention, the plurality of power stack controllers are synchronized according to the clock signal, and the switches of the individual power stacks are controlled according to a control signal from the converter control station to shape the output of the power converter.

In an embodiment of the invention, the converter control station and at least some of the power stack controllers comprise at least two data processors, and the at least two data processors are dedicated to handle communication to and from the controller in which they are located.

In an aspect of the invention, it relates to a control system comprising a plurality of controllers wherein at least some of the plurality of controllers comprise at least two data processors, and wherein the at least two data processors are dedicated to handle communication to and from the controller in which they are located.

FIGURES

A few exemplary embodiments of the invention will be described in more detail in the following with reference to the figures, in which.

DETAILED DESCRIPTION OF THE INVENTION

Figure 1:
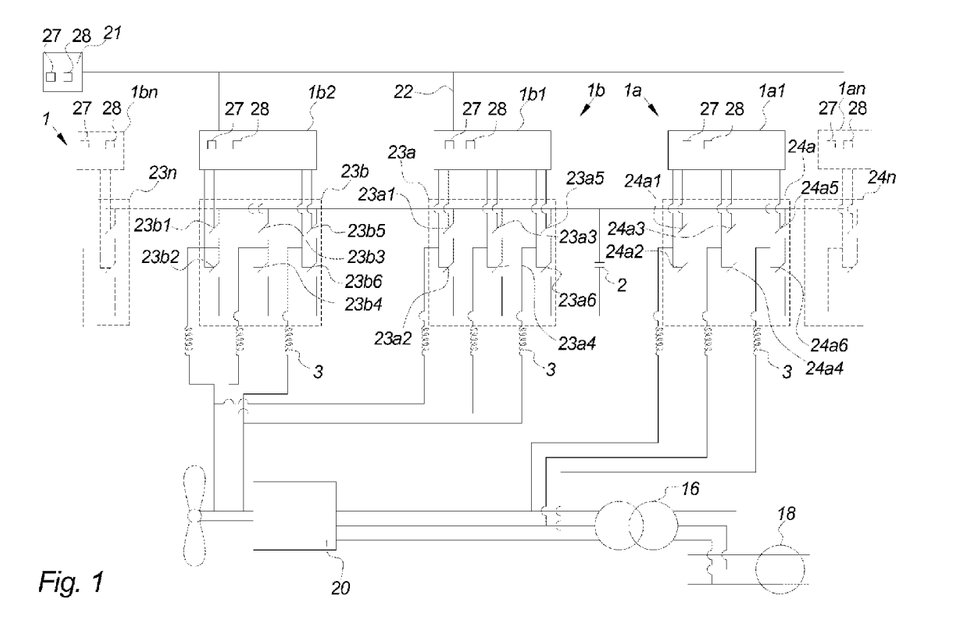
FIG. 1 illustrates schematically a part of a power converter to be controlled according to an aspect of the present invention.

FIG. 1 illustrates schematically parts of the control arrangement for power generation in a wind turbine having a doubly fed induction generator 20. The frequency of the electrical output of the stator windings of the generator 20 varies as a consequence of varying rotor speed. To be able to supply this output to the utility grid, the frequency needs to comply with the relevant grid codes, e.g., by having a constant frequency of 50 or 60 Hz. It should be noted that the present invention will work after the same principles on other types of power generators, e.g., wind turbines having full power converter, solar systems, etc.

In order to meet such grid code requirements, a power converter 1 is introduced between the rotor and the stator output of the generator 20. The power converter 1 comprises a rotor side inverter 1b, which is connected to the rotor of the generator 20. The rotor side inverter 1b, in turn, comprises power stacks 23a, 23b, . . . , 23n.

Further, the power converter 1 comprises a DC link 2, a grid side inverter 1a comprising grid side power stacks 24a, 24n and a converter control station 21. Power stack controllers 1a1, . . . , 1an and 1b1, 1b2, . . . , 1bn on the grid side and the rotor side of the generator 20 respectively, control the switches 23a1-23a6, 23b1-23b6, . . . , 23n1-23n6, 24a1-24a6, . . . , 24n1-24n6 of the power converter 1.

Furthermore, inductors 3 are located in the current paths from the power converter 1 to the generator 20. It should be mentioned that, in other embodiments, the power converter 1 may be controlled by two converter control stations 21, one of which controls the grid side inverter 1a, while the other controls the rotor side inverter 1b of the power converter 1.

Thus, the power converter 1 is capable of controlling the rotor currents of the generator so that the desired frequency and power output of the generator stator are met.

The output from the stator of the generator 20, i.e. the voltage with the adjusted frequency, is transformed to comply with the voltage on the utility grid 18 by means of a transformer 16 before it is supplied to the utility grid 18.

Figure 2:
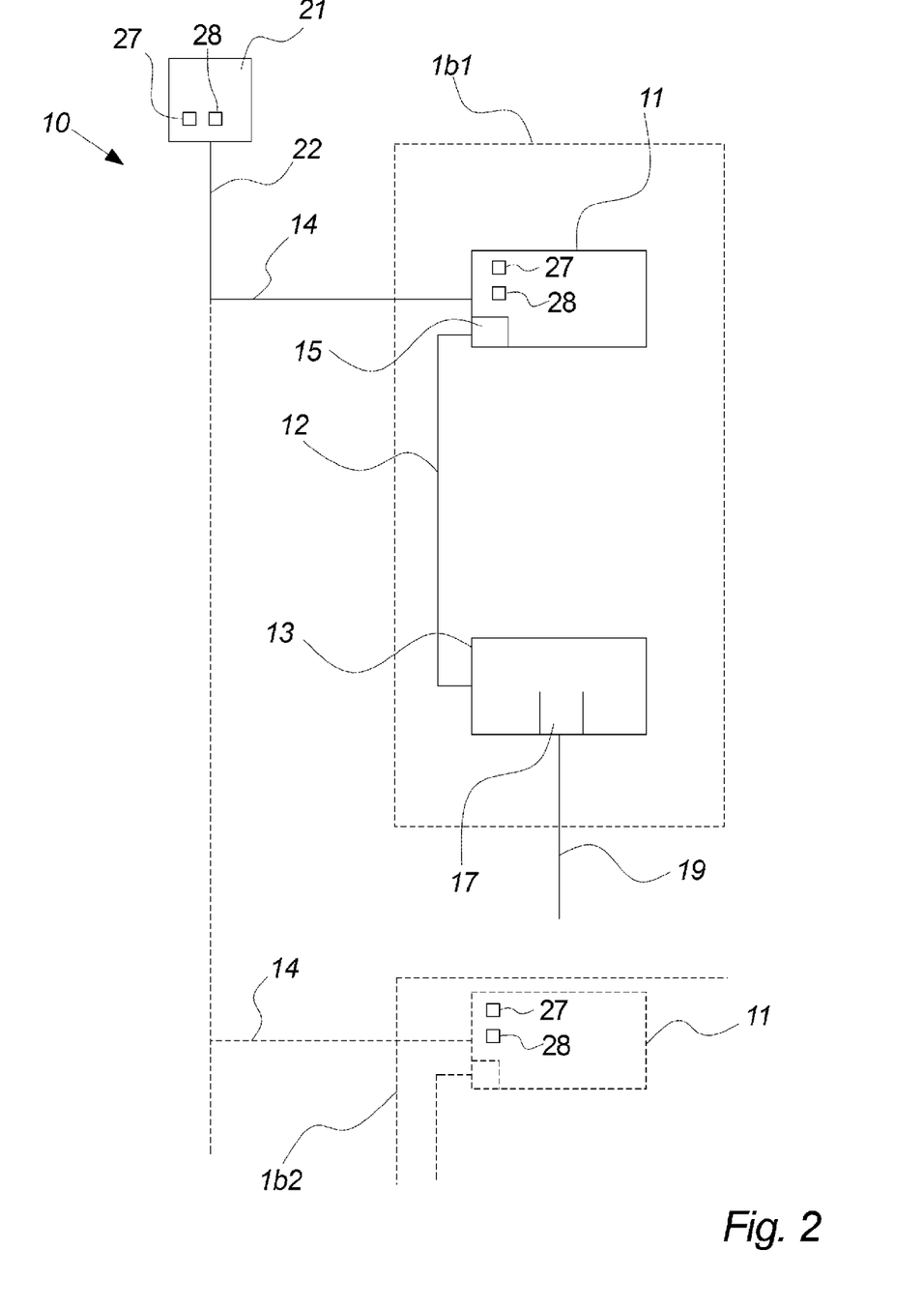
FIG. 2 illustrates schematically the configuration of a controller of a control system according to an embodiment of the invention.

FIG. 2 illustrates schematically the configuration of a power stack controller 1b1 of a control system according to an embodiment of the invention. A converter control station 21 communicates via a real time communication bus 22 with power stack controllers 1b1, 1b2. Each of the power stack controllers 1b1, 1b2 comprises at least two electronic circuits 11, 13. The first 11 of these is part of a dedicated real-time communication system 10 also including the converter control station 21, a main wind turbine controller, etc. The second one is a data processor 13, such as a digital signal processor (DSP), microprocessor, etc., for generating a switching signal.

Furthermore, the converter control station 21 and each of the power stack controllers 1b1, 1b2 comprise two additional electric circuits each in form of data processors 27, 28. The data processors 27, 28 are dedicated to communication to and from the controllers, in which they are located, via the real time communication system 10, i.e. the real time communication bus 22.

Even though it may be expensive to implement the additional data processors 27, 28, the benefits of the faster communication compensate for the extra price. The data processor 27 prepares data to be send from the controller and the data processor 28 is dedicated to receive data sent to the controller.

In this way, it becomes possible to broadcast, in one data pack, data from one controller to all the others, e.g. from one power stack controller to all the other power stack controllers or from the converter control station 21 to all the power stack controllers 1b1, 1b2. Hence within the same communication frame it is possible to exchange information between controllers on the entire real-time communication system 10.

Furthermore, faster communication introduces less delay in the control algorithm, which again facilitates better control, such as, e.g., better current sharing between power stacks.

In a real-time communication network 10 of a wind turbine comprising a main wind turbine controller communicating with pitch controllers, power converter controllers, yaw controllers, etc. and where these controllers all comprise additional data processors 27, 28, the same advantages related to sending and receiving data within the same communication frame can be obtained on a wind turbine communication network level as is obtained in the control of the converter.

One function of the real time communication system 10 is to conduct a communication delay test. The communication delay test is carried out before the power converter 1 is started up. In principle, the communication delay test comprises a master (e.g., the converter control station 21) sending out a synchronization signal to slaves (e.g., circuit 11 in the power stack controllers 1b1, 1b2) on the communication bus 22. Based on the delays of responses from the slaves, the master calculates and communicates a common synchronous time signal to which the clocks of the slaves adjust. The communication delay test hereby ensures that inaccuracies in processor design, delays in the communication lines, etc., are neutralized and that a precise common synchronous time signal is achieved in the communication system 10.

The communication of this precise common synchronous time signal ensures that the circuits 11 in the power stacks 23a-23n, 24a-24n of the power converter 1 can be synchronized, preferably down to a precision better than one micro second.

After this initial synchronization procedure, a distributed clock signal 14 is used as reference by the slaves ensuring that the precise synchronization is maintained in the communication system 10. During operation of the power stacks, the distributed clock signal 14 is only required to arrive at the power stacks 1b1, 1b2 every 5 or 10 ms in order for the processors therein to compensate for inaccuracies due to temperature differences at the processors, hardware deviations between the processors, etc.

In the following, the power stack controller 1b1 is used as an example to explain the invention in more detail, remembering that the data processors at least of electronic circuit 11 in all the power stack controllers 1b1, 1b2 are synchronized as described above.

As mentioned, the first electronic circuit 11, which is dedicated for real-time communication, receives a communication frame including the clock signal 14 distributed throughout the real-time communication buses 22 of the real-time communication system 10. This means that the distributed clock signal 14 ensures that every controller 1b1, 1b2 connected to the real-time communication system 10 has a common understanding of the time in the dedicated real-time communication system 10.

The electronic circuit 11 comprises a synchronization output module 15 which, as mentioned, is kept synchronous with synchronization output modules 15 in other power stacks controllers by means of the distributed clock signal 14.

From the electronic circuit 11, a reference signal 12 is send to the data processor 13. This reference signal 12 is used by the data processor 13 to generate control signals 19 for controlling the switches of the power stack. This enables control of the switching signals 19 with a very high degree of accuracy relating to the other power stacks across the communication network 10. This could be used to ensure simultaneous switching time in power stacks across the network, preferably with a precision better than 1 microsecond.

To sum up this first part of the synchronization, the electrical circuit 11 generates a reference signal 12 to the data processor 13, and this reference signal 12 is preferably synchronous across all power stack controllers in the power converter 1 due to the distributed clock signal 14, which may be included in the communication frame.

As an example, it could be mentioned that if the switching frequency is 2.5 KHz, the reference signal 12 may be sent every 400 microseconds.

The data processor 13 comprises its own clock generator for generating a clock frequency, which is used to generate the switching frequency or switching signal 19. This switching signal 19 may be created by means of pulse-width modulation (PWM) in the data processor 13 based on a synchronization/counter module 17 which is counting between zero and a predefined maximum value. The synchronization/counter module 17 ensures that the maximum value of the PWM signal is synchronous with the reference signal 12, i.e. since the reference signal 12 is synchronously across all power stacks 1b1, 1b2, the maximum value of the PWM signal from the data processor 13 therefore also becomes synchronous across all power stacks 1b1, 1b2. The synchronization of the PWM signal to the reference signal 12 is necessary due to the fact that the data processors 13 in the individual power stacks 1b1, 1b2 are not operating completely uniformly. Differences may occur during operation of the data processor 13 because of different ambient temperatures in the power stacks 1b1, 1b2, differences in the manufacturing process of the data processors, oscillators, etc.

The switching signal 19 is determined by an algorithm running either in the converter control station 21 or in the data processor 13 of the power stack controller 1b1. The algorithm associates each of the "counts" of the PWM signal with a voltage. In this way, it becomes possible for the converter control station 21 (indirectly at least via the data processor 13) to control the switches of the different power stacks in order to obtain a desired total output from the entire power converter 1. This is explained in more detail below with reference to FIGS. 3 and 4.

In the following the control of the power converter 1 will be described in more detail with reference to the rotor side inverter 1b.

As mentioned above, the rotor side inverter b comprises one or more power stacks 23a, 23b, 23n each having switching elements such as, e.g., Insulated Gate Bipolar Transistors (IGBT) or the like 23a1-23a6, 23b1-23b6. The individual switches 23a1-23a6, 23b1-23b6, are controlled by power stack controllers 1b1, 1b2, . . . , 1bn, which again are controlled by a converter control station 21 and/or a wind turbine control station (not illustrated).

Each power stack of the power converter is controlled by a power stack controller 1b1 as illustrated on FIG. 2. The power stack controller ibi communicates with other power stack controllers and with the converter control station 21 via the communication system 10. As illustrated, each power stack controller comprises at least two additional electronic circuits 27, 28. The reason for having two circuits is that it enables fast data communication in that it is possible for the converter control station 21 to send and receive data within the same communication frame. This, of course, requires that the converter control station 21 also comprises at least two electronic circuits 27, 28. Data packets may then, e.g., be send from the circuit 27 of the converter controller to circuits 27 of the power stack controllers in the same communication frame as circuits 28 of the power stack controllers may send data to the circuit 28 of the converter controller.

The above described use of the additional data processors dedicated for communication may be scaled up to the control system of a wind turbine or a wind power park. Hence, in the above mentioned hierarchical master-slave configuration of the communication network of the wind turbine or wind power park, the same benefits such as less delay in control algorithm due to faster communication may be obtained.

Figure 3:
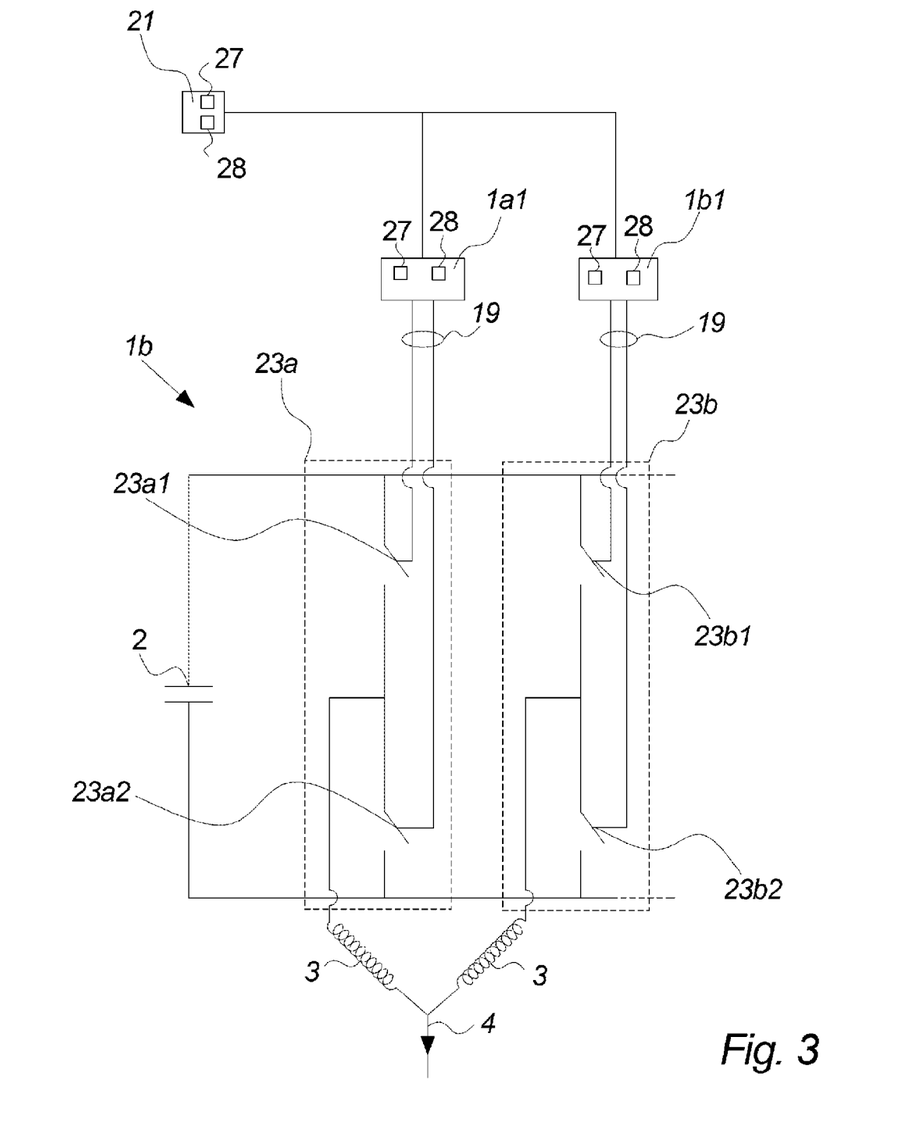
FIG. 3 illustrates schematically the control of a couple of power stacks of a power converter according to an aspect of the invention.

FIG. 3 illustrates schematically the control of one electrical phase in the two power stacks 23a and 23b in the rotor side inverter 1b according to an aspect of the invention, wherein the magnetic field of the rotor is controlled to establish a predetermined frequency of the output of the stator windings of the generator 20. The rotor side inverter 1b is fed with a DC voltage 2, which may, for instance, be of 1.1 kV. Each of the power stacks 23a, 23b comprises six electronic switches, of which only two 23a1, 23a2, 23b1, 23b2 are illustrated in FIG. 3. One switch 23a1, 23b1 of each power stack 23a, 23b connects the positive side of the DC voltage to the output 4, the other 23a2, 23b2 connects the negative side of the DC voltage 2 to the output 4. The switching of the electronic switches 23a1, 23a2, 23b1, 23b2 are controlled by means of a control signal 19 from the respective power stack controller 1a1, 1b1.

To increases the possibility of controlling the power stacks and/or of current sharing between paralleled power stacks, it is important to be able to control the switches of the individual power stacks very accurately. In case the control of the switches is not accurate, a risk occurs that the current is not shared according to predefined control design, i.e. one power stack may take over more current than it is rated for and thereby a risk of damaging the power stack occurs.

Following the accurate control of current in the power stacks, it is possible to optimize components such as the inductors 3. The inductors 3 are both expensive and heavy for being placed in the nacelle of a wind turbine. Hence, it is desirable to have accurate control in order to minimize the size of these inductors 3.

The connectors for each of the electrical phases from each of the power stacks 23a, 23b to the output 4 is equipped with a noise reducing and/current absorbing inductor 3 for eliminating or at least significantly reducing noise and short circuit currents (also sometimes referred to as transient current spikes).

Pulse-width modulation through appropriate control of the switching times for switching the individual electronic switches 23a1-23a6, 23b1-23b6 on and off is used for creating an AC voltage driving a current to the rotor of the generator 20 via the output 4.

Figure 4:
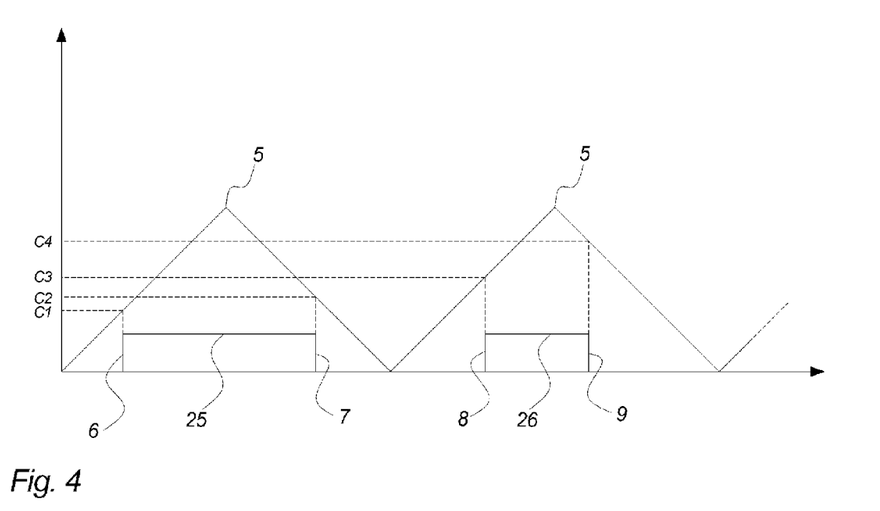
FIG. 4 illustrates schematically the control of the timing of electronic switches in a power stack according to an embodiment of the invention.

FIG. 4 illustrates schematically the control of the timing of electronic switches 23a1-23a6 in power stack 23a according to an embodiment of the invention. The synchronization/counter module 17 counts continuously up and down between zero and a predefined maximum value as indicated by reference number 5 in FIG. 4, In other embodiments, the synchronization/counter module 17 may begin counting upwards from zero again, whenever the maximum value has been reached. This does not influence the basic functions of the control system.

A control algorithm, e.g., located in the converter control station 21 calculates at which counter values C1, C2, C3, C4 of the counter, the switches must be switched on or off in order to obtain the correct pulse widths needed to create the desired AC output voltage signal by pulse-width modulation. FIG. 4 indicates how this switching on and off results in correctly timed leading edges 6, 8 and trailing edges 7, 9, respectively of two consecutive pulses 25, 26. The pulses 25, 26 illustrate the periods in which a switch of a power stack is on, i.e. conducting current. Hence, leading edges 6, 8 are "turn on" signal to the switches, and trailing edges 7, 9 are "turn off" signal to the switches.

The term "correctly timed" should be understood as timed appropriately for making the switches 23a1-23a6 shape the desired output voltage from the power converter 1 and at the same time allowing an optimized current sharing between the power stacks 23a-23n, 24a-24n of the power converter 1.

In an embodiment of the invention, the control algorithm and the data processor 13 calculate for each of the switches the times, at which these switches are to be turned on and off, respectively. The more precise the switches of different power stacks are controlled, the better current sharing is obtained, leading in turn to minimized power losses in conductors, smaller sizes of the inductors 3, smaller risk of short circuit currents, etc. The control algorithm may be placed either in the power converter controller 21 or in the power stack controller 1a1, 1b1.

This is explained by the following example referring to FIGS. 3 and 4. The switch 23a1 is controlled by the first power stack controller 1a1. More specifically, the switch 23a1 is controlled by the pulse 25. Hence, switch 23a1 is closed (turned on) at the leading edge 6 of the pulse 25.

The second power stack controller 1b1 controls switch 23b1 by means of a pulse from a similar PWM signal (not illustrated). Ideally, the control ensures that the edge 6, 7 of the pulse 25 are exactly simultaneous in all parallel power stacks, here illustrated by switches 23a1 and 23b1.

The present invention facilitates the compensating for hardware differences in semiconductors, e.g. due to production tolerances, by controlling the position of the edges 6, 7 as desired ensuring controlled current sharing.

Because the present invention facilitates a precise common synchronization of the starting time of synchronization output modules 15 across all power stack controllers 1a1, 1b1, the output of the control system, i.e. the pulses 25, 26, can be controlled very accurately. By accurate control is understood that it is possible to synchronize the trailing and leading edges of the pulses of all power stacks in the power converter 1 or alternatively to distribute the switching times of the switches so that not all edges rise or fall synchronously in the power converter. Distributing the switching times makes it possible to optimize the generated noise of the system enabling smoother and more broad-spectrum noise than is the case with synchronized switching. This makes it possible to optimize filter components in the system and the general performance of the complete system.

Minor deviations from ideal synchronization, e.g., due to different temperatures of the processors or inaccuracies in the processor hardware, are inevitable. These deviations may be eliminated or significantly reduced by the communication delay test as described above, or the counts determining the timing of the leading 6, 8 or trailing edges 7, 9 may be adjusted taking these deviations into consideration.

Minor deviations may be absorbed by the inductors 3. If the deviation becomes too large, the current imbalance may increase and there may be a risk of damaging the power converter 1. In this case, the converter control station 21 may send a stop of production control signal to the wind turbine controller.

The present invention is advantageous in that the synchronization output modules 15 located in each power stack controller 1a1 . . . , 1an, 1b1, 1b2, . . . , 1bn are all synchronized by the distributed clock signal 14 and thereby are capable of generating synchronized reference signals 12. The reference signals 12 are then used to adjust the synchronization/counter modules 17 generating the switching signals 19.

This makes the control system of the present invention capable of synchronizing the PWM signal created by the synchronization/counter module 17 to any given form of synchronization pulse from the real time communication system 10, i.e. the distributed clock signal 14.

Another advantage of the control system according to the present invention is that it is infinitely scalable. In systems known in the art, the PWM pattern is normally calculated in a common data processor, from which it is distributed to the individual power stacks via a logic circuit, such as a field programmable gate array. This means that the capacity is limited by the number of connection pins, and it needs a rigorous synchronization. In the present invention, however, the PWM patterns may be calculated locally by the individual power stack controllers 1b1, 1b2, . . . , 1bn, which function as autonomous units, and other controllers can always be added to the buses of the real-time communication system.

It should be emphasized that the scope of the present invention is not restricted to the description above, which represents a few exemplary and illustrative embodiments only, whereas the scope of the invention is defined by the following claims.

LIST OF REFERENCE NUMBERS

1. Power converter
1a. Grid side power inverter
1b. Rotor side power inverter
1a1 ...., 1an, 1b1, 1b2, ..., 1bn. Power stack controllers
2. DC voltage
3. Noise reducing inductor
4. Output for pulse-width modulation
5. Output from PWM counter
6. Leading edge of first pulse
7. Trailing edge of first pulse
8. Leading edge of second pulse
9. Trailing edge of second pulse
10. Communication system
11. First circuit dedicated real-time communication
12. Reference signal
13. Digital signal processor
14. Distributed clock signal
15. Synchronization output module
16. Transformer
17. Synchronization/counter module
18. Utility grid
19. Switching signal for electronic switches
20. Generator
21. Converter control station
22. Real-time communication bus
23a, 23b, ..., 23n, Rotor side power stacks
23a1-23a6, 23b1-23b6, ..., 23n1-23n6. Rotor side power stack switches
24a, ..., 24n. Grid side power stacks
24a1-24a6, ..., 24n1-24n6. Grid side power stack switches
25. Pulse indicating a switch is on
26. Pulse indicating a switch is on
27. Additional data processors for communication
28. Additional data processors for communication
C1. First leading edge counter value
C2. First trailing edge counter value
C3. Second leading edge counter value
C4. Second trailing edge counter value

What is claimed is:

1. A control system for one or more power stacks in a power converter, each power stack comprising a plurality of electronic switches, said control system comprising one or more controllers, wherein a distributed clock signal from a wired real-time communication system is configured to be used for synchronization for the switches in the power stacks, wherein at least part of the one or more controllers comprise two data processors dedicated at least to handle communication to and from the at least part of the one or more controllers in which they are located.

2. A control system according to claim 1, wherein one or more controllers configured for controlling switching times of the switches in one or more power stacks are connected directly to one or more real-time communication buses of the real-time communication system, configured to use the distributed clock signal for synchronization of pulses when using the one or more power stacks for pulse-width modulation of a desired AC output voltage.

3. A control system according to claim 1, wherein the power converter is a part of a power generation system, such as a wind turbine, a wind power plant or a solar power plant.

4. A control system according to claim 3, wherein the one or more controllers form part of a larger control system for a wind turbine or a wind power park, the larger control system being arranged in a hierarchical master/slave configuration using the real-time communication system comprising one or more real-time communication buses.

5. A control system according to claim 1, wherein the real-time communication system is a real-time Ethernet system and the distributed clock signal is configured to be a clock signal distributed by the real-time communication buses of this system.

6. A control system according to claim 1, wherein the control system is configured so that the distributed clock signal is used to synchronize the switching of the electronic switches in the power stacks so that simultaneous switching of the electronic switches is obtained.

7. A control system according to claim 6, wherein the control system is configured so that the distributed clock signal is used to synchronize the switching of the electronic switches in the power stacks of the power converters of two or more wind turbines in a wind power park, preferably all the wind turbines in the wind power park.

8. A control system according to claim 1, wherein the control system is configured so that the distributed clock signal is used to synchronize the switching of the electronic switches in the power stacks so that the switching times of the different electronic switches are distributed throughout the switching period.

9. A control system according to claim 1, wherein one of the at least two data processors is dedicated to handle data sent to the controller, and wherein another of the at least two data processors is dedicated to handle data sent from the controller in which they are located.

10. A control system according to claim 1, wherein the controller comprising the at least two additional data processors is able to send and receive data within the same communication frame.

11. A power converter comprising a control system according to claim 1.

12. A wind turbine comprising one or more power converters according to claim 1.

13. A wind turbine, a wind power plant or a solar power plant, wherein said wind turbine, wind power plant or a solar power plant comprises a power converter with one or more power stacks, and wherein said wind turbine, wind power plant or solar power plant comprises control system according to claim 1 for controlling said one or more power stacks.

14. A method of synchronizing switches in one or more power stacks of a power converter, the method comprising the steps of:
   establishing a control system comprising at least a converter control station and a plurality of power stack controllers,
   establishing a wired real-time communication system through which the converter control station and the plurality of power stack controllers can communicate,
   performing a communication delay test of at least a part of said wired real-time communication system,
   based on the result of the communication delay test distributing a common synchronous time signal via said wired real-time communication system from said converter control station to the plurality of power stack controllers, and
   adjusting the internal clock of the power stack controllers to the common synchronous time signal.

15. A method according to claim 14, wherein the plurality of power stack controllers are synchronized according to the clock signal, and wherein the switches of the individual power stacks are controlled according to the control signal from the converter control station to shape the output of the power converter.

16. A method according to claim 14, wherein the converter control station and at least some of the power stack controllers comprise at least two data processors, and wherein the at least two data processors are dedicated to handle communication to and from the controller in which they are located.

17. A method according to claim 14, wherein the method further comprising the step of during operation of the power stacks, a distributed clock signal is repetitive used as reference by the power stack controllers to maintain the synchronization in the real-time communication system.

18. A control system comprising a plurality of controllers, wherein at least some of the plurality of controllers comprise at least two data processors, and wherein the at least two data processors are dedicated to handle communication to and from the controller in which they are located.

* * * * *

UNITED STATES PATENT AND TRADEMARK OFFICE
CERTIFICATE OF CORRECTION

| | |
|---|---|
| PATENT NO. | : 9,276,488 B2 |
| APPLICATION NO. | : 14/373180 |
| DATED | : March 1, 2016 |
| INVENTOR(S) | : Anders Eriksen and Rasmus Nielsen |

It is certified that error appears in the above-identified patent and that said Letters Patent is hereby corrected as shown below:

In the Specification

Column 8, Line 21 "rotor side inverter b" should read -- rotor side inverter 1b --

Column 8, Line 31 "stack controller ibi" should read -- stack controller 1b1 --

Signed and Sealed this
Seventh Day of June, 2016

Michelle K. Lee
*Director of the United States Patent and Trademark Office*